(12) United States Patent
Iwauchi

(10) Patent No.: US 8,363,134 B2
(45) Date of Patent: Jan. 29, 2013

(54) COLOR IMAGING DEVICE, IMAGING APPARATUS USING THE SAME, AND FILTER

(75) Inventor: Kenichi Iwauchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/671,341

(22) PCT Filed: Jul. 31, 2008

(86) PCT No.: PCT/JP2008/063729
§ 371 (c)(1),
(2), (4) Date: Jan. 29, 2010

(87) PCT Pub. No.: WO2009/017184
PCT Pub. Date: Feb. 5, 2009

(65) Prior Publication Data
US 2010/0265383 A1    Oct. 21, 2010

(30) Foreign Application Priority Data
Aug. 1, 2007  (JP) ................... 2007-200939

(51) Int. Cl.
*H04N 3/14* (2006.01)
*H04N 5/335* (2011.01)
(52) U.S. Cl. .......................................... 348/277
(58) Field of Classification Search .......... 348/276, 348/277, 266, 272, 273
See application file for complete search history.

(56) References Cited

U.S. PATENT DOCUMENTS

| | | | | |
|---|---|---|---|---|
| 5,786,588 | A * | 7/1998 | Takahashi | 348/273 |
| 6,714,243 | B1 * | 3/2004 | Mathur et al. | 348/273 |
| 2001/0024237 | A1 * | 9/2001 | Osada et al. | 348/273 |
| 2007/0268377 | A1 * | 11/2007 | Nagano et al. | 348/222.1 |

FOREIGN PATENT DOCUMENTS

| | | |
|---|---|---|
| EP | 1 729 524 A1 | 12/2006 |
| JP | 2002-142228 A | 5/2002 |

(Continued)

OTHER PUBLICATIONS

Japanese Office Action for corresponding application No. 2009-525443 dated May 15, 2012.

*Primary Examiner* — Jason Whipkey
(74) *Attorney, Agent, or Firm* — Birch, Stewart, Kolasch & Birch, LLP

(57) ABSTRACT

Light 2 that is the subject to be imaged enters a lens system 3, and the light is transmitted and absorbed by a color filter 5. The transmitted components enter an image sensor 4 to be imaged. The color filter 5 is composed of, as shown in FIG. 7B, a transparent pixel (W) and micro filters including a filter (W-X) with a complementary color for the color matching function X, a filter (W-Y) with a complementary color for the color matching function Y, and a filter (W-Z) with a complementary color for the color matching function Z. Each of them is arranged to correspond in position to each pixel of the image sensor. As a result, light with components in the entire wavelength region, light with complementary color components of X, light with complementary color components of Y, and light with complementary color components of Z enter their respective pixels to be imaged. From such images, W-(W-X), W-(W-Y), and W-(W-Z) are calculated to reproduce an image corresponding to XYZ, whereby accurate color imaging is possible. Accordingly, accurate color values can be imaged with high light use efficiency.

11 Claims, 13 Drawing Sheets

FOREIGN PATENT DOCUMENTS

| | | |
|---|---|---|
| JP | 2003-018611 A | 1/2003 |
| JP | 2005-260527 A | 9/2005 |
| JP | 2006-211478 A | 8/2006 |
| WO | WO-2005/086495 A1 | 9/2005 |

* cited by examiner

Conceptual diagrams of light use efficiency of XYZ-complementary color single-chip system (a)

(b)

2: Incident light
3: Lens system
4: Image sensor
5: Color filter

Imaging device of the present invention

Process output

Conceptual diagrams of light use efficiency of XYZ-complementary color three-chip system 11: Incident light
12: Lens system
13a: Red image sensor
13b: Blue image sensor
13c: Green image sensor
14a: Red mirror
14b: Blue mirror Conceptual diagram of three-chip system (a)          (b)

21: Incident light
22: Lens system
23: Image sensor
25: Color filter

Conceptual diagram of single-chip system

Conceptual diagrams of light use efficiency of RGB three-chip system

Conceptual diagrams of light use efficiency of RGB single-chip system

Conceptual diagrams of light use efficiency of XYZ three-chip system

COLOR IMAGING DEVICE, IMAGING APPARATUS USING THE SAME, AND FILTER

TECHNICAL FIELD

The present invention relates to a color imaging device that captures a color image, an imaging apparatus, and a filter.

BACKGROUND ART

Imaging apparatus that are currently used create color images by separating incident light through the use of, for example, color filters of the primary colors of red, green, and blue. Color imaging apparatus are broadly divided into the following two types: so-called three-chip systems in which three identical image sensors are used as shown in FIG. 10, and so-called single-chip systems in which a single image sensor is used and a color filter is arranged for each pixel as shown in FIG. 11A. As image sensors, CCD (Charge Coupled Device) image sensors, CMOS (Complementary Metal Oxide Semiconductor) image sensors, and the like are used.

In the three-chip system shown in FIG. 10, incident light 11 that is the subject to be imaged enters a lens system 12. Among such light, light with red components is reflected by a red mirror 14a, and then enters a red, image sensor 13a to be imaged. Similarly, light with blue components is reflected, by a blue mirror 14b, and then enters a blue image sensor 13b to be imaged. Light with green components is not reflected by the red mirror 14a or the blue mirror 14b, but enters a green image sensor 13c to be imaged. As described above, light with red components, light with green components, and light with blue components enter the red, green, and blue image sensors, respectively, to be imaged. Combining such images will allow reproduction of the original subject to be imaged.

In the single-chip system shown in FIG. 11A, incident light 21 that is the subject to be imaged enters a lens system 22. Then, the light is transmitted and absorbed by a color filter 25 and enters an image sensor 23 to be imaged. The color filter 25 is composed of micro filters of red (R), green (G), and blue (B) as shown in FIG. 11B, which are arranged such that the position of each filter corresponds to the position of each pixel of the image sensor. The red filter transmits light with red components and absorbs light with other components. The green filter transmits light with green components and absorbs light with other components. The blue filter transmits light with blue components and absorbs light with other components. Consequently, light with red components, light with green components, and light with blue components enter their respective pixels to be imaged. Combining such images will allow reproduction of the original subject to be imaged. It should be noted that, the color filter shown in FIG. 11B is only exemplary. Typically, more green pixels than red and blue pixels are provided in order to provide high spatial frequency to luminance signals.

As in the aforementioned structure, the three-chip system, which requires three image sensors, has problems in that cost could increase and the size of the system could also increase due to the complex structure. The three-chip system, however, is capable of performing imaging with high light use efficiency compared to the single-chip system. Such points will be described with reference to FIGS. 12 and 13.

FIG. 12 are conceptual diagrams illustrating, the light use efficiency of the three-chip system. As shown in FIG. 12A, the horizontal axis represents the wavelength of incident light and the vertical axis represents the light intensity thereof. A state in which the light intensity is constant at various wavelengths is shown. When such light is reflected by the red mirror and enters the red image sensor, long-wavelength light with red components is obtained as shown in FIG. 12B. When loss by the mirror and the like is ignored, the light intensity of the obtained light can be considered as the same as that of the original incident light. Similarly, light reflected by the blue mirror becomes, upon entering the blue image sensor, short-wavelength light with blue components as shown in FIG. 12D. When loss by the mirror and the like is ignored, the light intensity of the obtained light can be considered that of the original incident light. Light with the rest green components, upon entering the green image sensor, becomes that shown in FIG. 12C. When loss by the mirror and the like is ignored, the light intensity of the obtained light can be considered as the same as that of the original incident light. Light that can be used to reproduce the subject to be imaged by electronically combining the light that has entered each image sensor is shown in FIG. 12E, which is the same as the incident light shown in FIG. 12A. Thus, quite high light use efficiency is ensured.

FIG. 13 are conceptual diagrams illustrating the light use efficiency of the single-chip system. As shown in FIG. 13A, the horizontal axis represents the wavelength of incident light and the vertical axis represents the light intensity thereof. The light is transmitted and absorbed by the filters. Light with red components is transmitted by the red filter, and it becomes, upon entering the image sensor, that shown in FIG. 13B. When loss by the filter and the like is ignored, the light intensity of the obtained light can be considered as the same as that of the original incident light. Similarly, light with green components is transmitted by the green filter, and it becomes, upon entering the image sensor, that shown in FIG. 13C. When loss by the filter and the like is ignored, the light intensity of the obtained light can be considered as the same as that of the original incident light. Light with blue components is transmitted by the blue filter, and it becomes, upon entering the image sensor, that shown in FIG. 13D. When loss by the filter and the like is ignored, the light intensity of the obtained light can be considered as the same as that of the original incident light.

However, if a filter with a pixel configuration (RGB) shown two-dimensionally in FIG. 11B, among which four pixels include one red pixel, two green pixels, and one blue pixel, is used for the single-chip system, for example, the intensity of light with red, green, and blue components is decreased to 1/4, 2/4, and 1/4, respectively as shown in FIGS. 13E, 13F, and 13G, in proportion to the areas of the pixels. Thus, light that can be used to reproduce the subject to be imaged by electronically combining the light that has entered each mage sensor is decreased to about 1/3 as shown in FIG. 13H, which greatly differs from the incident light shown in FIG. 13A. Thus, the light use efficiency is low.

Further, when color images are created using red, green, and blue color filters as described above, the resulting colors do not match the colors perceived by humans, and cannot cover the entire color range (color gamut) that can be perceived by humans. In order to solve such problems, a method as described in Patent Document 1 below is disclosed. In the patent document, XYZ color matching functions defined by the CIE are linearly transformed, and filters that are substantially equivalent to the XYZ color matching functions are used (see FIG. 14). Using such filters can realize a moving-image camera with a color gamut that is equal to the color gamut of humans.

Patent Document 1: JP Patent Publication (Kokai) No. 2005-260527 A

DISCLOSURE OF THE INVENTION

Problems to be Solved by the Invention

However, the method of Patent Document 1 above has a problem in that the light use efficiency is significantly deteriorated. This results from the fact that, of the filters such as those shown in FIG. 14, two filters of (b) and (c) have large overlapping wavelength regions, unlike a filter with separated colors of red, green, and blue. For example, in the structure of the three-chip system shown in FIG. 10, if the filter characteristics of (c) of FIG. 14 are realized with a mirror, it follows that almost no light, which should be obtained with the filter characteristics of (b) of FIG. 14, would enter the image sensor. Specifically, according to Document 1, incident light is, as shown in FIG. 15, split into three beams by an optical beam splitter 302 after passing through a lens system 301, and then the beams pass through filters 303, 304, and 305 equivalent to the XYZ color matching functions, and finally enter their respective optical sensors (image sensors) 307, 308, and 309.

The concept of the light use efficiency for the above case will be described with reference to FIG. 16. As shown in FIG. 16A, the horizontal axis represents the wavelength of incident light and the vertical axis represents the light intensity thereof. A state in which the light intensity is constant at various wavelengths is shown. The light is split into three beams by the optical beam splitter so that the light intensity is decreased to 1/3 as shown in FIG. 16B, FIG. 16C, and FIG. 16D. After that, given wavelength bands of the beams are filtered with filters equivalent to the XYZ color matching functions as shown in FIG. 16E, FIG. 16F, and FIG. 16G. In practice, the wavelength bands of FIG. 16E and FIG. 16F, for example, are substantially the same. However, they are illustrated as seen in the drawings for the sake of clarity. As a result, as shown in FIG. 16H, the light intensity becomes about 1/3 that of the incident light shown in FIG. 16A. Thus, even though the three-chip system is used, the light use efficiency is low. Although the document also describes the use of a single-chip system, there still remains a problem that the light use efficiency is also about 1/3 since the area is divided.

It is an object of the present invention to image accurate color values while ensuring high light use efficiency of an imaging device.

Means for Solving the Problems

According to one aspect of the present invention, there is provided a color imaging device configured to capture a color image, comprising at least the following four filters: a transparent filter, a filter that exhibits a complementary color for a transmission characteristic of a color matching function X, a filter that exhibits a complementary color for a transmission characteristic of a color matching function Y, and a filter that exhibits a complementary color for a transmission characteristic of a color matching function Z.

There is also provided a color imaging device configured to capture a color image; comprising at least the following four filters: a transparent filter, a filter that exhibits a complementary color for a transmission characteristic equivalent to a color matching function X a filter that exhibits a complementary color for a transmission characteristic equivalent to a color matching function Y, and a filter that exhibits a complementary color for a transmission characteristic equivalent to a color matching function Z.

The color imaging device configured to capture a color image may further comprise at least the following four pixels each having a filter: a pixel with a transparent filter, a pixel with a filter that exhibits a complementary color for a transmission characteristic of a color matching function X, a pixel with a filter that exhibits a complementary color for a transmission characteristic of a color matching function Y, and a pixel with a filter that exhibits a complementary color for a transmission characteristic of a color matching function Z. In such a case, the transparent pixel and the pixel that exhibits the complementary color for the transmission characteristic of the color matching function Y may be arranged diagonally.

The color imaging device configured to capture a color image may alternatively comprise at least the following four pixels each having a filter: a pixel with a transparent filter, a pixel with a filter that exhibits a complementary color for a transmission characteristic equivalent to a color matching function X, a pixel with a filter that exhibits a complementary color for a transmission characteristic is equivalent to a color matching function Y, and a pixel with a filter that exhibits a complementary color for a transmission characteristic equivalent to a color matching function Z. In such a case, the transparent pixel and the pixel that exhibits the complementary color for the transmission characteristic equivalent to the color matching function Y may be arranged diagonally.

The present invention can also provide an imaging apparatus comprising any of the aforementioned color imaging devices.

There are also provided filters for use in a color imaging device, comprising at least the following four filters for pixels: a filter for a transparent pixel, a filter for a pixel, the filter exhibiting a complementary color for a transmission characteristic of a color matching function X, a filter for a pixel, the filter exhibiting a complementary color for a transmission characteristic of a color matching function Y, and a filter for a pixel, the filter exhibiting a complementary color for a transmission characteristic of a color matching function Z. Alternatively, there may also be provided filters for use in a color imaging device, which comprise at least the following four filters for pixels: a filter for a transparent pixel, a filter for a pixel, the filter exhibiting a complementary color for a transmission characteristic equivalent to a color matching function X, a filter for a pixel, the filter exhibiting a complementary color for a transmission characteristic equivalent to a color matching function Y, and a filter for a pixel, the filter exhibiting a complementary color for a transmission characteristic equivalent to a color matching function Z.

In that case, the filter for the transparent pixel and the filter for the pixel, which exhibits the complementary color for the transmission characteristic of the color matching function Y, may be arranged diagonally. In addition, the filter for the transparent pixel and the filter for the pixel, which exhibits the complementary color for the transmission characteristic equivalent to the color matching function Y, may be arranged diagonally.

Advantageous Effects of the Invention

According to the present invention, accurate color values can be imaged with high light use efficiency by using transparent pixels and filters that exhibit complementary colors for the color matching functions XYZ.

DESCRIPTION OF SYMBOLS 1 imaging device
2 incident light
3 lens system
4 image sensor
5 color filter

BEST MODES FOR CARRYING OUT THE INVENTION

Hereinafter, best modes for carrying out the present invention will, be described with reference to the accompanying drawings.

Figure 1:
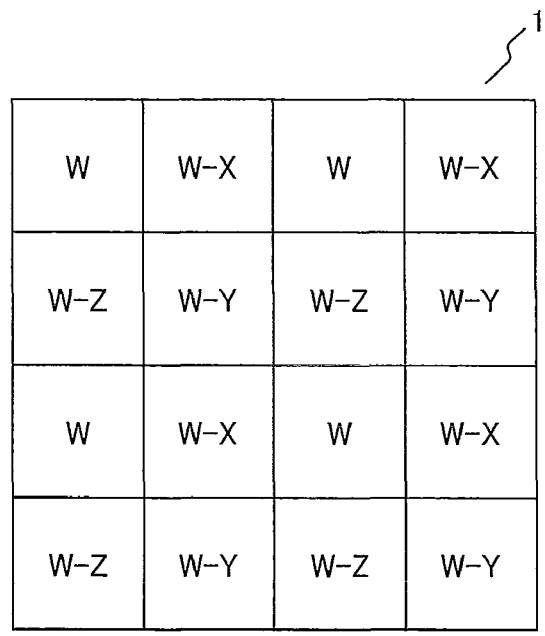
FIG. 1 is a conceptual diagram of an imaging device in accordance with the first embodiment of the present invention.

FIG. 1 schematically shows a part of an imaging device (a part of pixels including color filters; hereinafter referred to as an "imaging device") in accordance with the first embodiment of the present invention. As shown in FIG. 1, an imaging device 1 of the present embodiment includes a number of pixels that are arrayed on a two-dimensional plane. The plurality of pixels include a transparent pixel (W) that transmits light in almost the entire visible wavelength region, a pixel (W-X) including a filter that exhibits a complementary color for the color matching function X, a pixel (W-Y) including a filter that exhibits a complementary color for the color matching function Y, and a pixel (W-Z) including a filter that exhibits a complementary color for the color matching function Z. A plurality of such pixels together form a color filter in a two-dimensional manner. Here, the pixel (W-X) including a filter that exhibits a complementary color for the color matching function X refers to a pixel with a filter that exhibits a complementary color for the color matching function X shown in FIG. 2, that is, a filter with a characteristic W-X shown in FIG. 3 that is obtained by subtracting the transmissivity of the color matching function X from a transmissivity of 100%. Similarly, the pixel (W-Y) including a filter that exhibits a complementary color for the color matching function Y, and the pixel (W-Z) including a filter that exhibits a complementary color for the color matching function Z refer to pixels with filters that respectively exhibit complementary colors for the color matching functions Y and Z shown in FIG. 2, that is, filters with characteristics W-Y and W-Z shown in FIG. 3 that are respectively obtained by subtracting the transmissivities of the color matching functions Y and Z from a transmissivity of 100%.

Signals obtained from the four pixels are subjected to arithmetic processing such that a signal value obtained from each of the W-X, W-Y, and W-Z pixels is subtracted from a signal value obtained from the W pixel. Accordingly, W-(W-X), W-(W-Y), and W-(W-Z), namely, X, Y, and Z result. Thus, XYZ that are the color values can be uniquely determined.

Figure 4:
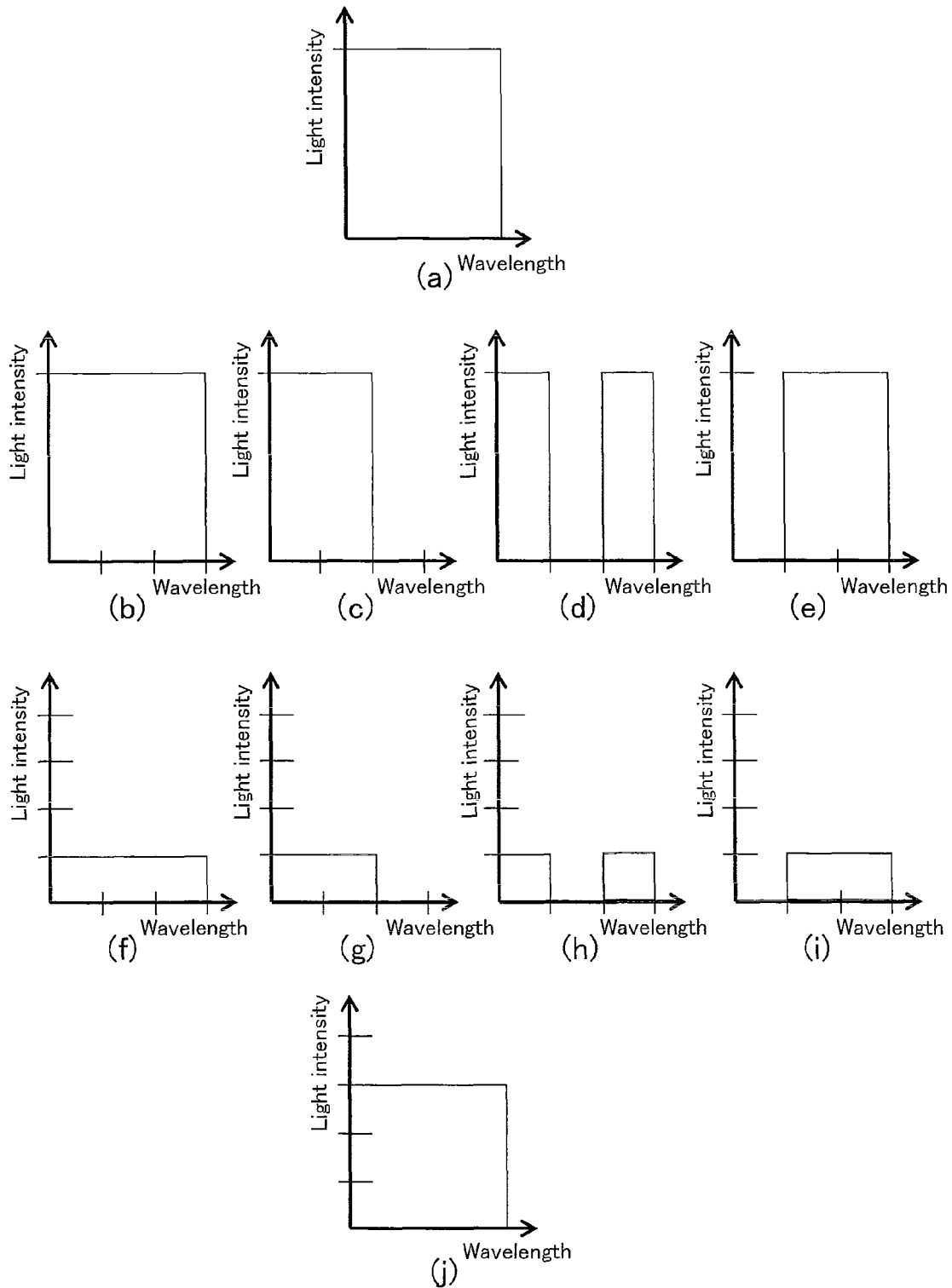
FIG. 4 are conceptual diagrams showing the light use efficiency in accordance with the present embodiment.

FIG. 4 are conceptual diagrams of the light use efficiency for the above case. As shown in FIG. 4A, the horizontal axis represents the wavelength of incident, light and the vertical axis represents the light intensity thereof. A state in which the light intensity is constant at various wavelengths is shown. The light is transmitted and absorbed by the aforementioned filters. Since the W pixel transmits light in almost the entire visible wavelength region, it has, upon entering the image sensor, components shown in FIG. 4B similar to the components of FIG. 4A. When loss is ignored, the light intensity of the obtained light can be considered as the same as that of the original incident light.

The W-X pixel absorbs X components and transmits light with W-X components. Thus, the light intensity becomes, upon entering the image sensor, that shown in FIG. 4C. When loss by the filter and the like is ignored, the light intensity of the obtained light can be considered as the same as that of the original incident light. Similarly, the W-Y pixel absorbs Y components and transmits light with W-Y components. Thus, the light intensity becomes, upon entering the image sensor, that shown in FIG. 4D. When loss by the filter and the like is ignored, the light intensity of the obtained light can be considered as the same as that of the original incident light.

The W-Z pixel absorbs Z components and transmits light with W-Z components. Thus, the light intensity becomes, upon entering the image sensor, that shown in FIG. 4E. When loss by the filter and the like is ignored, the light intensity of the obtained light can be considered as the same as that of the original incident light. However, since a single-chip system is employed, if the filter with the pixel configuration of FIG. 1 described in the present invention, in which four pixels include one W pixel, one W-X pixel, one W-Y pixel, and one W-Z, pixel is used, the intensity of light becomes 1/4 in proportion to the area thereof. That is, the light intensity becomes 1/4 as shown in FIGS. 4F, 4G, 4H, and 4I. Thus, light that can be used to reproduce the subject to be imaged by electronically combining the light that has entered each image sensor is deceased to about 3/4 as shown in FIG. 4J, compared to the light intensity of the incident light shown in FIG. 4A. Accordingly, the light use efficiency can be improved two times or more the light use efficiency (1/3) of a single-chip system or a three-chip system that uses conventional XYZ filters.

Figure 2:
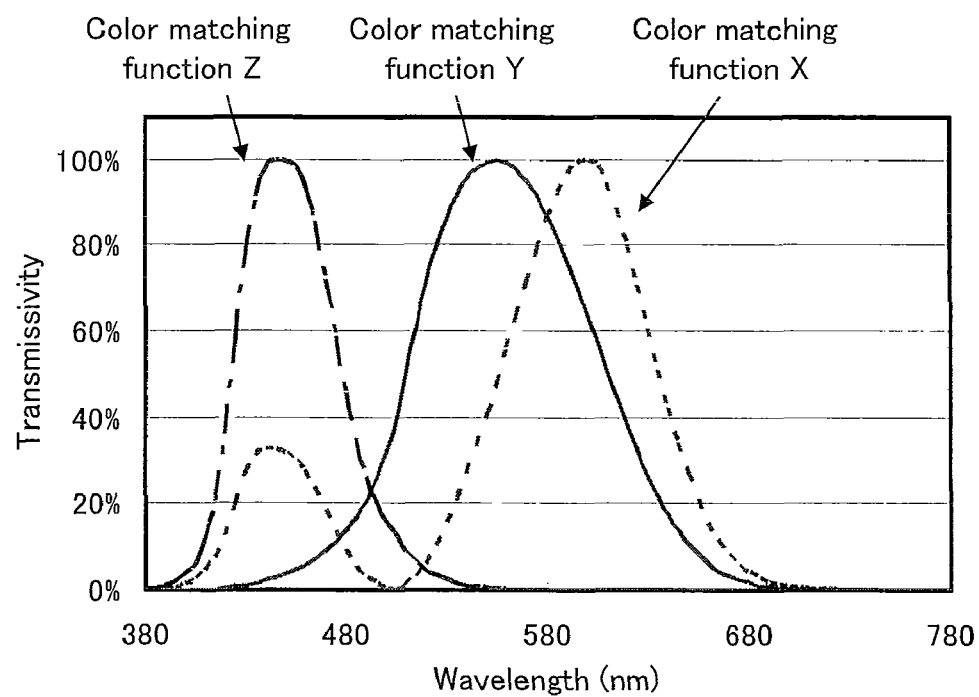
FIG. 2 shows the spectral characteristics of color matching functions XYZ.
Figure 3:
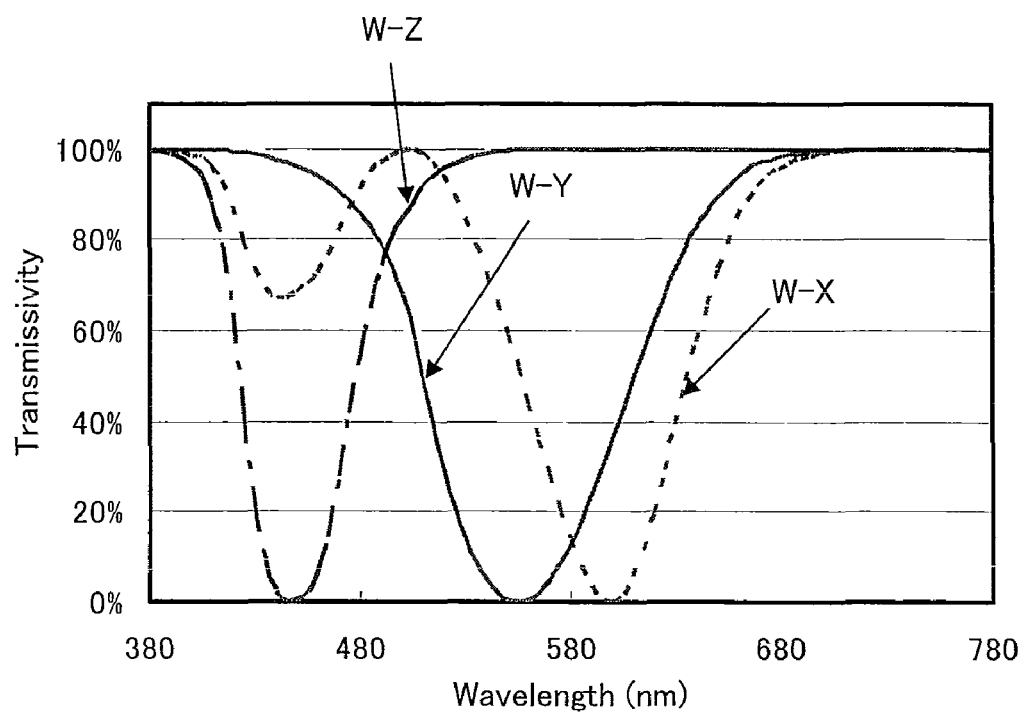
FIG. 3 shows the spectral characteristics of W-X, W-Y, and W-Z that exhibit complementary colors for the color matching functions XYZ.
Figure 5:
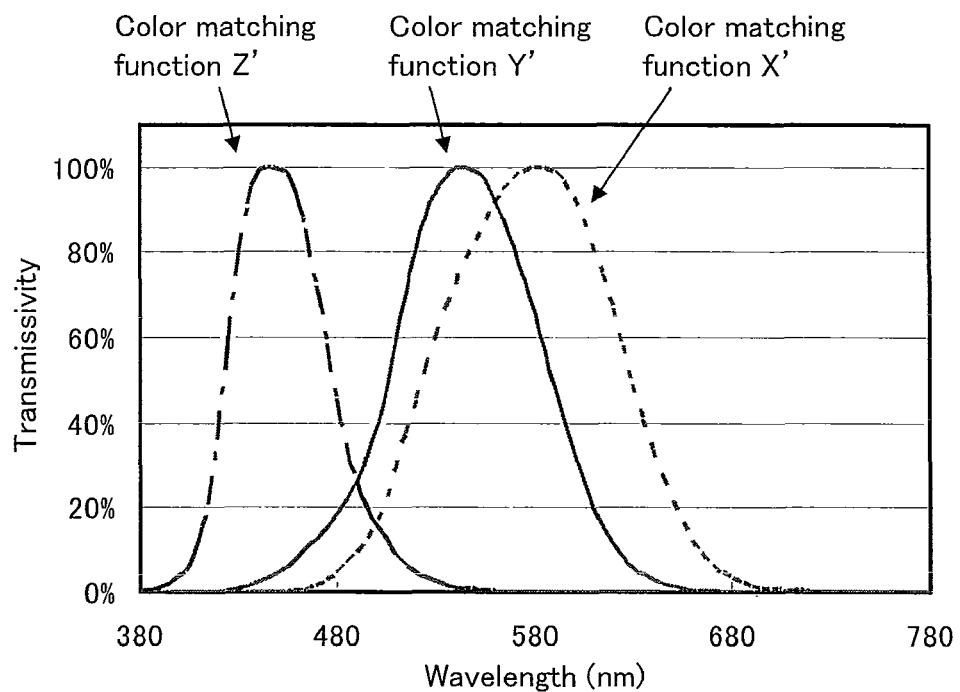
FIG. 5 shows the spectral characteristics of filters that are equivalent to the color matching functions XYZ in an imaging device in accordance with the second embodiment of the present invention.
Figure 6:
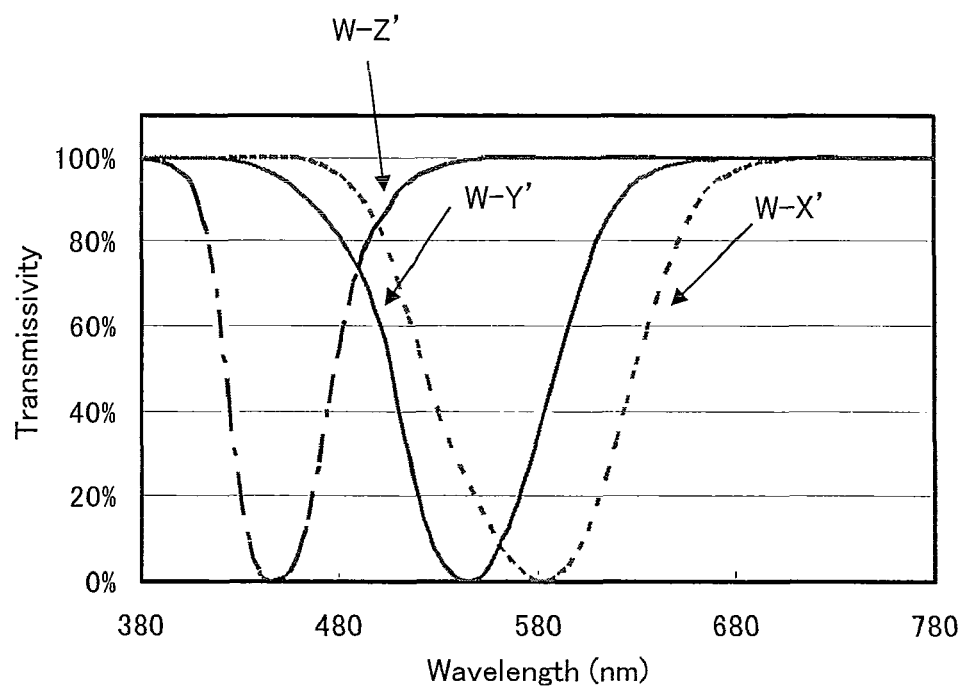
FIG. 6 shows the spectral characteristics of complementary colors of filters that are equivalent to the color matching functions XYZ in accordance with the present embodiment.

Next, the second embodiment of the present invention, will be described. In the aforementioned first embodiment, description has been made of a technique of using XYZ that have exactly the same spectral characteristics as the color matching functions. However, even when filters, which are obtained by linearly transforming the color matching functions and thus are substantially equivalent to the XYZ color matching functions, are used, operations and effects similar to those of the first embodiment can be obtained. For example, linearly transforming the XYZ color matching functions shown in FIG. 2 yields the spectral characteristics of X'Y'Z' as shown in FIG. 5. FIG. 6 shows spectral characteristics corresponding to W-X, W-Y, and W-Z. In comparison with the characteristics of the X filter having two peaks as shown in FIG. 2, for example, the characteristics with a single peak obtained by linear transformation of the X filter are advantageous in that fabrication is easy. In addition, since choices for the fabrication of the filters are increased the design flexibility can advantageously be increased.

In the description of the aforementioned embodiment of the present invention, W represents a transparent pixel that transmits light in almost the entire visible wavelength region. Thus, it is acceptable as long as the W-X filter, the W-Y filter, and the W-Z filter have filter characteristics that exhibit the complementary colors of X, Y, and Z, respectively. In view of the improvement of the light use efficiency, the transmissivity of W is desirably almost 100%. However, there are cases in which the transmissivity cannot be perfectly 100%. For example, since a CCD and the like have high sensitivity to light in the infrared wavelength region, if an infrared absorbing filter is provided to eliminate the influence of the infrared wavelength region, there is a possibility that light in the visible wavelength region may also be absorbed by the filter, whereby the transmissivity of the filter decreases. In such a case, other filters may be designed, taking such transmissivity into consideration.

For example, it is acceptable as long as the transmission characteristics of the W-X pixel are designed as the characteristics obtained by subtracting X from the transmission characteristics of the W pixel. That is, it is acceptable as long as a result obtained by subtracting the transmission characteristics of the W-X pixel from the transmission characteristics of the W pixel is equal to the color matching function X or spectral characteristics equivalent thereto. Such a point applies not only to the W pixel. Regardless of what characteristics each pixel may have, it is acceptable as long as the difference between the characteristics of the relevant pixel and the characteristics of the W pixel is equal to the color matching function X or spectral characteristics equivalent thereto. In sum, it is acceptable as long as the difference between the characteristics of the relevant pixel and the characteristics of a white pixel is equivalent to the color matching function.

The pixel arrangement shown in FIG. 1 is only exemplary, and thus the pixel arrangement is n of limited thereto. However, the transparent pixels and the pixels that exhibit a complementary color for the transmission characteristics of the color matching function Y are desirably arranged diagonally as shown in FIG. 1. That is, the W, W-Y, W, and W-Y pixels are desirably arranged diagonally in this order.

This is because, when the positional information of the subject to be imaged is to be processed by image processing, more accurate calculation of the positional information becomes possible if the W-Y pixel, which exhibits a complementary color for the transmission characteristics of the color matching function Y for obtaining luminance information, and the transparent W pixel including luminance information are arranged diagonally than if they are arranged perpendicularly or horizontally. Human eyes are sensitive to the color matching function Y. The color matching function Y is considered to influence not only brightness information but also resolution. Pixels related to the function Y include W-Y pixels, of course, and also include W pixels because the W pixels transmit light in the entire wavelength region including Y. Thus, the W pixel and the W-Y pixel are the subjects here.

In the present embodiment, it is considered that the aforementioned W pixels and W-Y pixels should not be arranged irregularly. That is, they are preferably arranged diagonally. X and Z are preferably arranged in positions that remain after the aforementioned W pixels and W-Y pixels are arranged.

Figure 7:
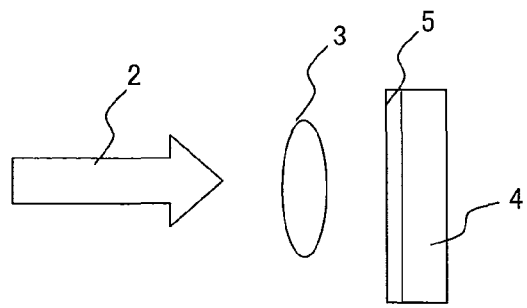
FIG. 7 are conceptual diagrams of an imaging apparatus in accordance with an embodiment of the present invention.
Figure 7:
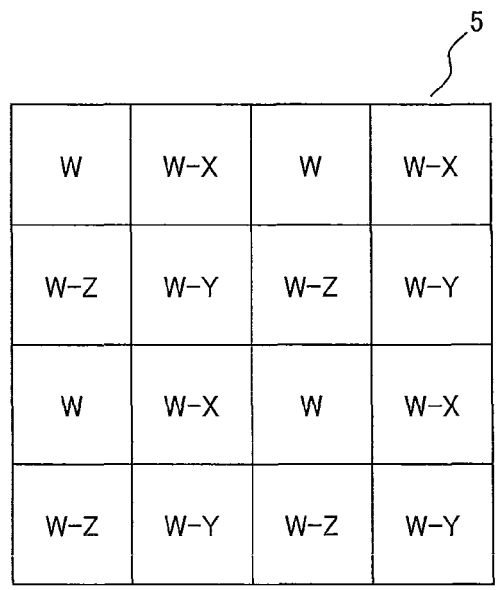

An example in which the imaging device in accordance with the aforementioned embodiment is applied to an imaging apparatus will be described with reference to FIG. 7. Light 2 that is the subject to be imaged enters a lens system 3, and the light is transmitted and, absorbed by a color filter 5. The transmitted components enter an image sensor 4 to be imaged. The color filter 5 is composed of, as shown in FIG. 7B, a transparent pixel (W) and micro filters including a filter (W-X) with a complementary color for the color matching function X, a filter (W-Y) with a complementary color for the color matching function Y, and a filter (W-Z) with a complementary color for the color matching function Z. Each of them is arranged to correspond in position to each pixel of the image sensor. As a result, light with components in the entire wavelength region, light with complementary color components of X, light with complementary color components of Y, and light with complementary color components of Z enter their respective pixels to be imaged. From such images, W-(W-X), W-(W-Y), and W-(W-Z) are calculated to reproduce an image corresponding to XYZ. Thus, accurate color imaging is possible.

Provided that, as exemplary signal processing for displaying the aforementioned image on a display, Xr, Yr, and Zr represent the color values of the display when red is displayed, Xg, Yg, and Zg represent the color values of the display when green is displayed, and Xb, Yb, and Zb represent the color values of the display when blue is displayed, the relational expression of the signal values r, g, and b inputted to the display and the displayed results X, Y, and Z is given by the following Formula 1.

$$\begin{pmatrix} X \\ Y \\ Z \end{pmatrix} = \begin{pmatrix} Xr & Xg & Xb \\ Yr & Yg & Yb \\ Zr & Zg & Zb \end{pmatrix} \begin{pmatrix} r \\ g \\ b \end{pmatrix} \quad \text{[Formula 1]}$$

That is, Formula 1 can be transformed into Formula 2 below, and thus the signal values r, g, and b that should be outputted to the display can easily be determined from the obtained values of X, Y, and Z.

However, it is often the case that nonlinearity called gamma should be taken into consideration for display. The values r, g, and b obtained herein are linear. Thus, it is necessary to take the gamma into consideration as appropriate.

$$\begin{pmatrix} r \\ g \\ b \end{pmatrix} = \begin{pmatrix} Xr & Xg & Xb \\ Yr & Yg & Yb \\ Zr & Zg & Zb \end{pmatrix}^{-1} \begin{pmatrix} X \\ Y \\ Z \end{pmatrix} \quad \text{[Formula 2]}$$

Figure 8:
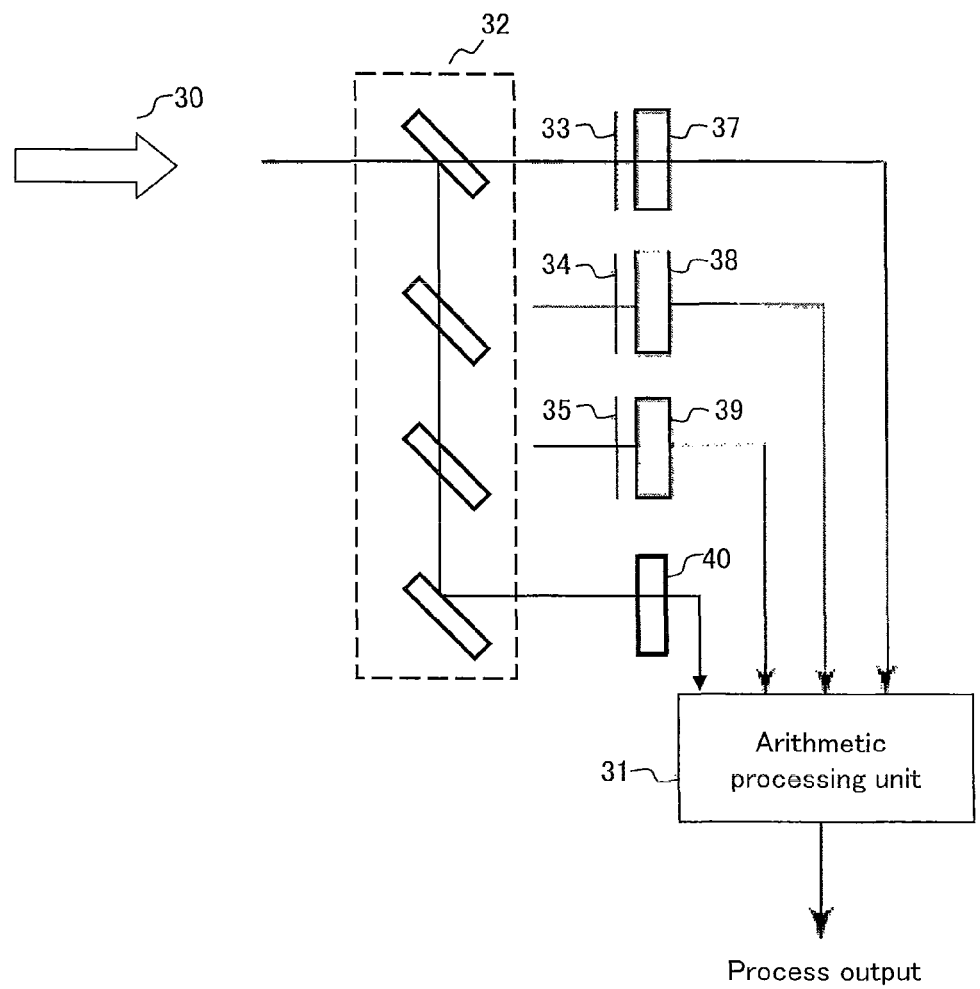
FIG. 8 is a conceptual diagram of an imaging apparatus in accordance with the third embodiment of the present invention.

Next, the third embodiment of the present invention will be described. As shown in FIG. 8, incident light 30 is split into four beams by an optical beam splitter 32. Then, the beams pass through filters 33, 34, and 35 with complementary colors for the XYZ color matching functions, respectively, and enter their respective optical sensors (image sensors) 37, 38, and 39. Light that has been split into four beams by the optical beam splitter 32 directly enters an optical sensor 40. The phrase "directly enter" herein is synonymous with "enter after passing through a transparent filter." Thus, a transparent filter may be provided before the optical sensor 40.

The signals obtained by the four optical sensors are subjected to arithmetic processing such that the signal value obtained by each of the W-X, W-Y, and W-Z sensors is subtracted from the signal value obtained by the W sensor (the optical sensor 40). Accordingly, W-(W-X), W-(W-Y), and W-(W-Z), namely, X, Y, and Z result. Thus, XYZ that are the color values can be uniquely determined.

Figure 9:
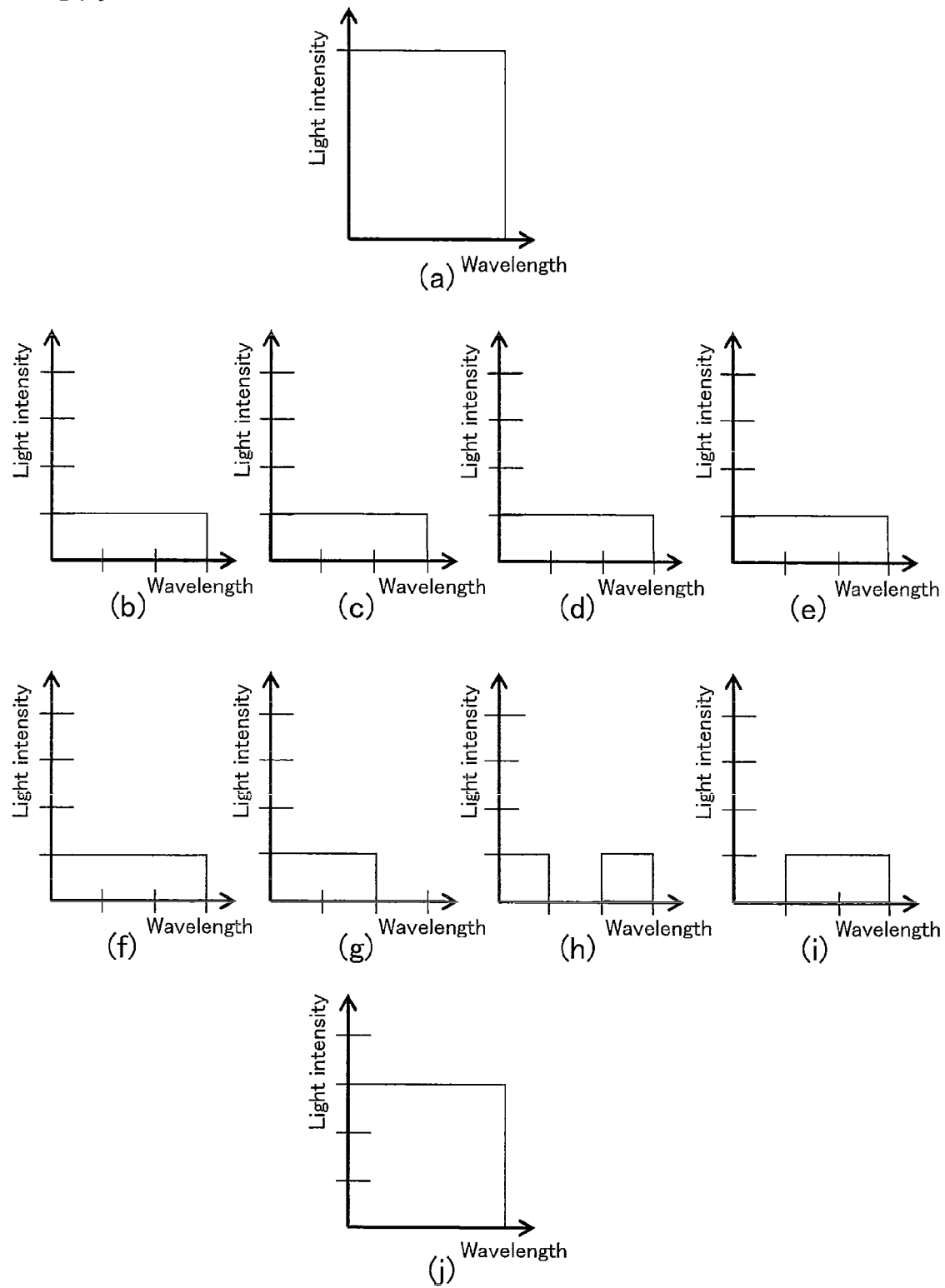
FIG. 9 are conceptual diagrams showing the light use efficiency of the imaging apparatus shown in FIG. 8.
Figure 10:
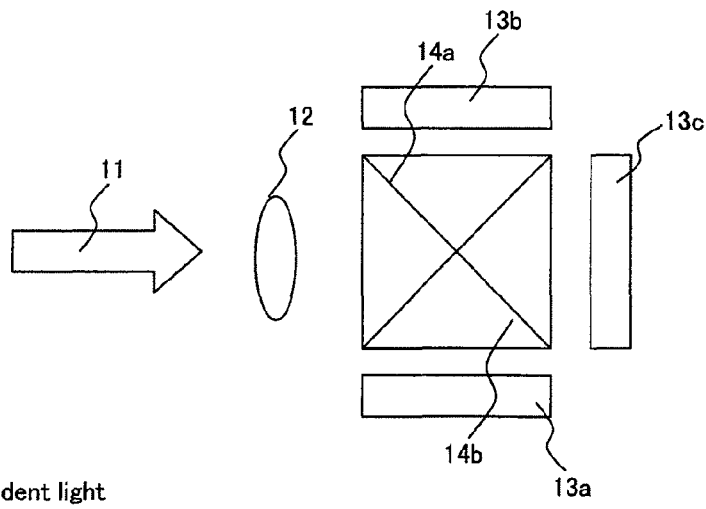
FIG. 10 is a conceptual diagram illustrating a typical three-chip system.
Figure 11:
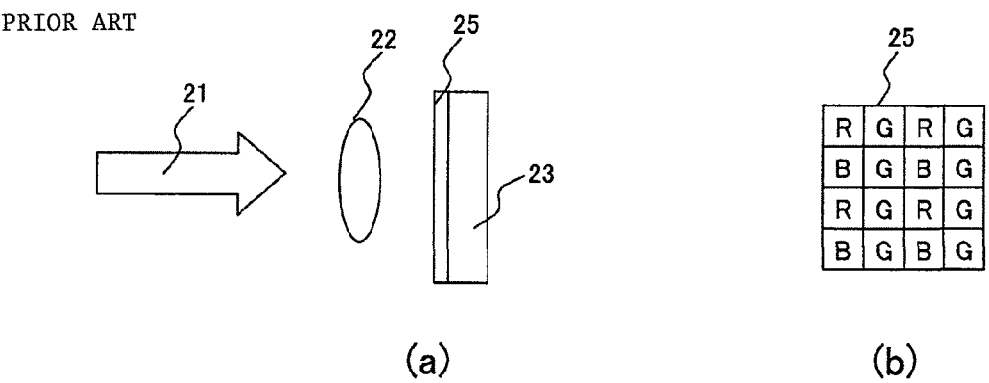
FIG. 11 is a conceptual diagram illustrating a typical single-chip system.
Figure 12:
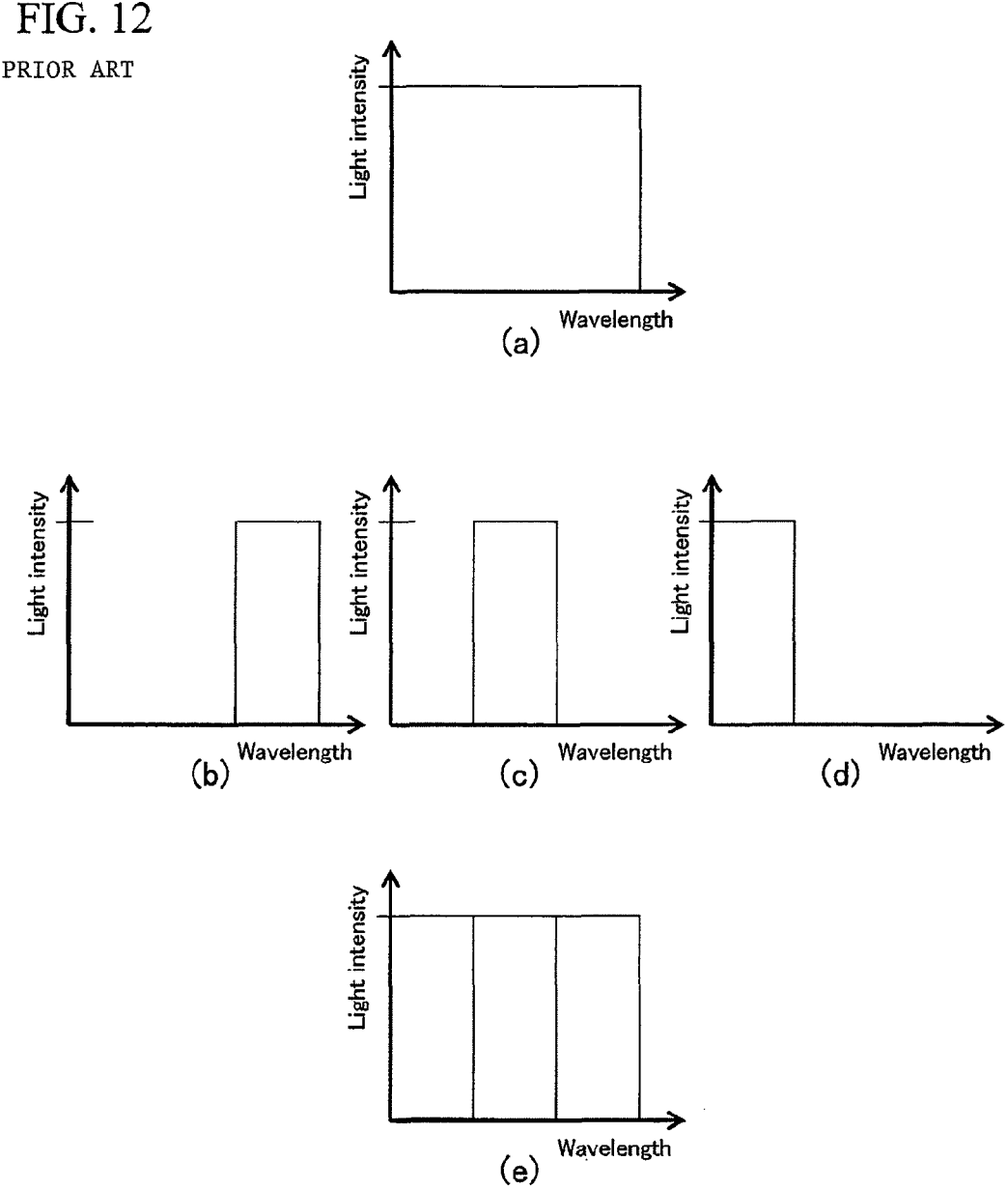
FIG. 12 are conceptual diagrams showing the light use efficiency of a typical three-chip system.
Figure 13:
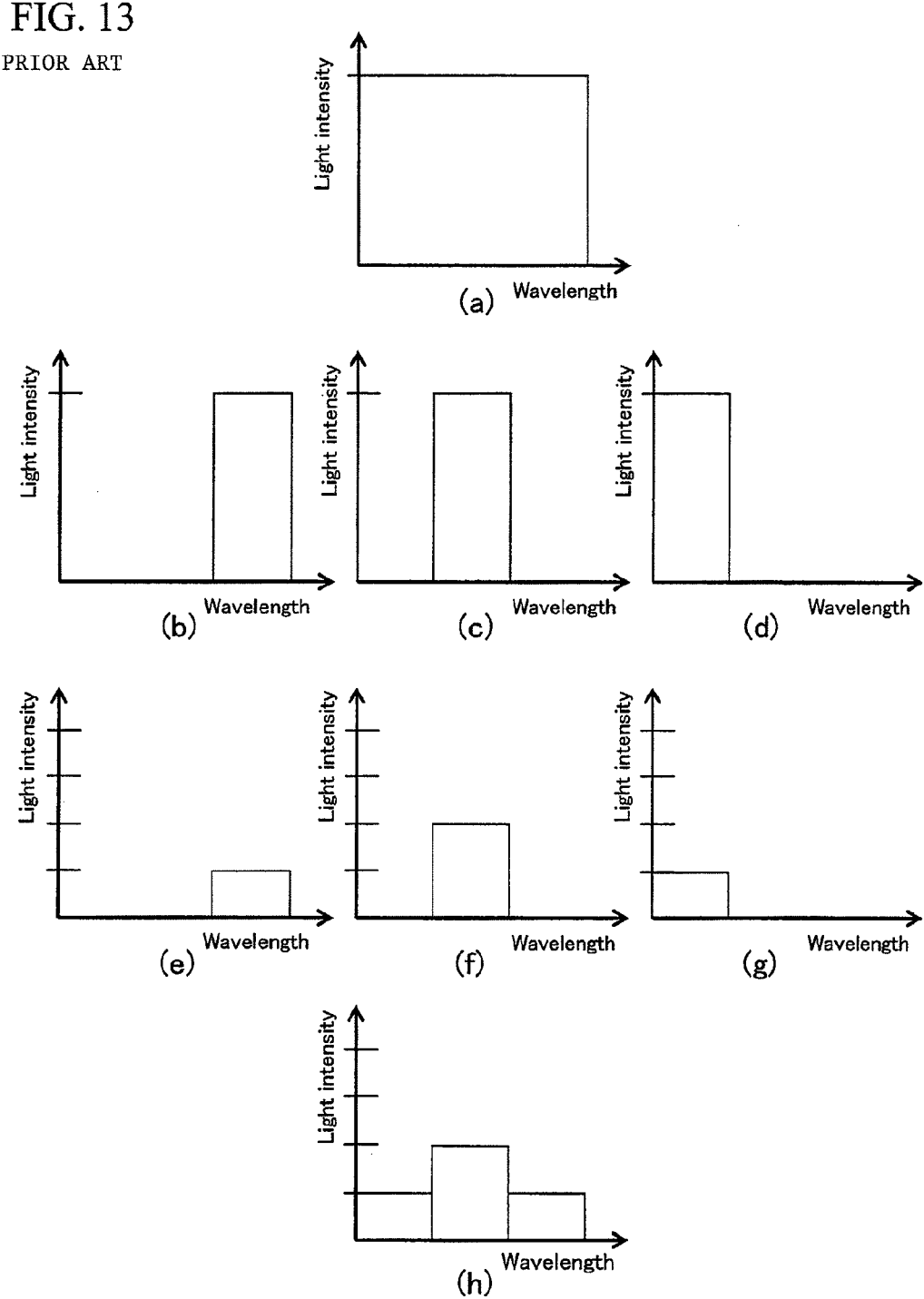
FIG. 13 are conceptual diagrams showing the light use efficiency of a typical single-chip system.
Figure 14:
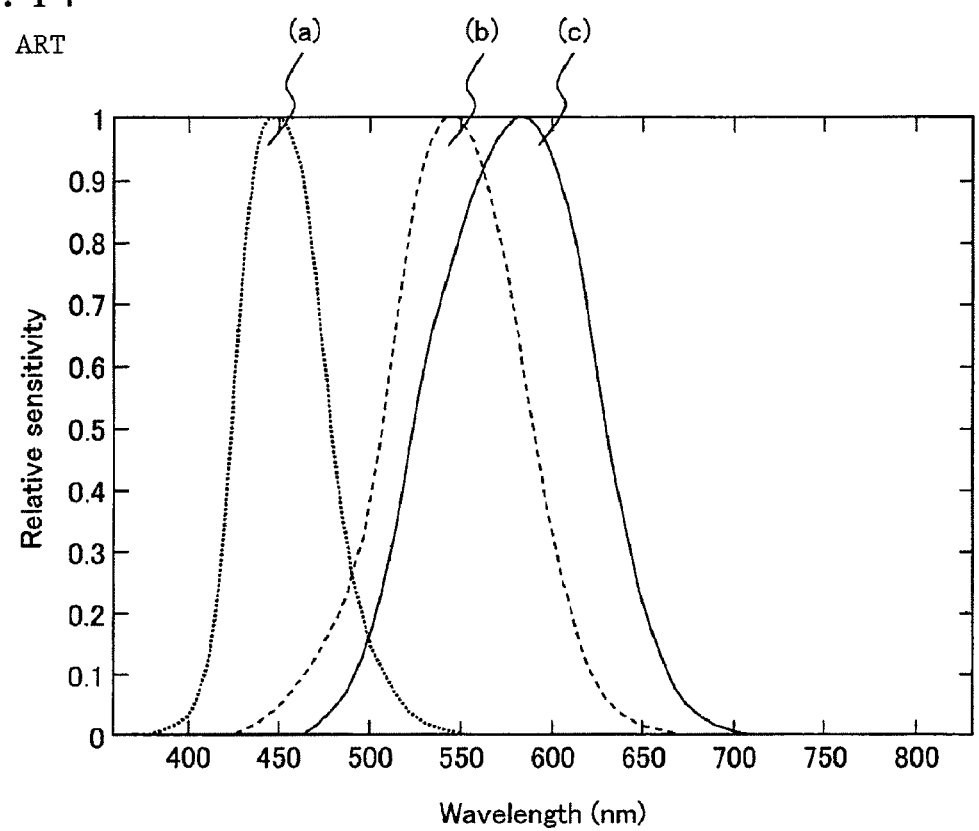
FIG. 14 shows the spectral characteristics of typical filters equivalent to color matching functions XYZ.
Figure 15:
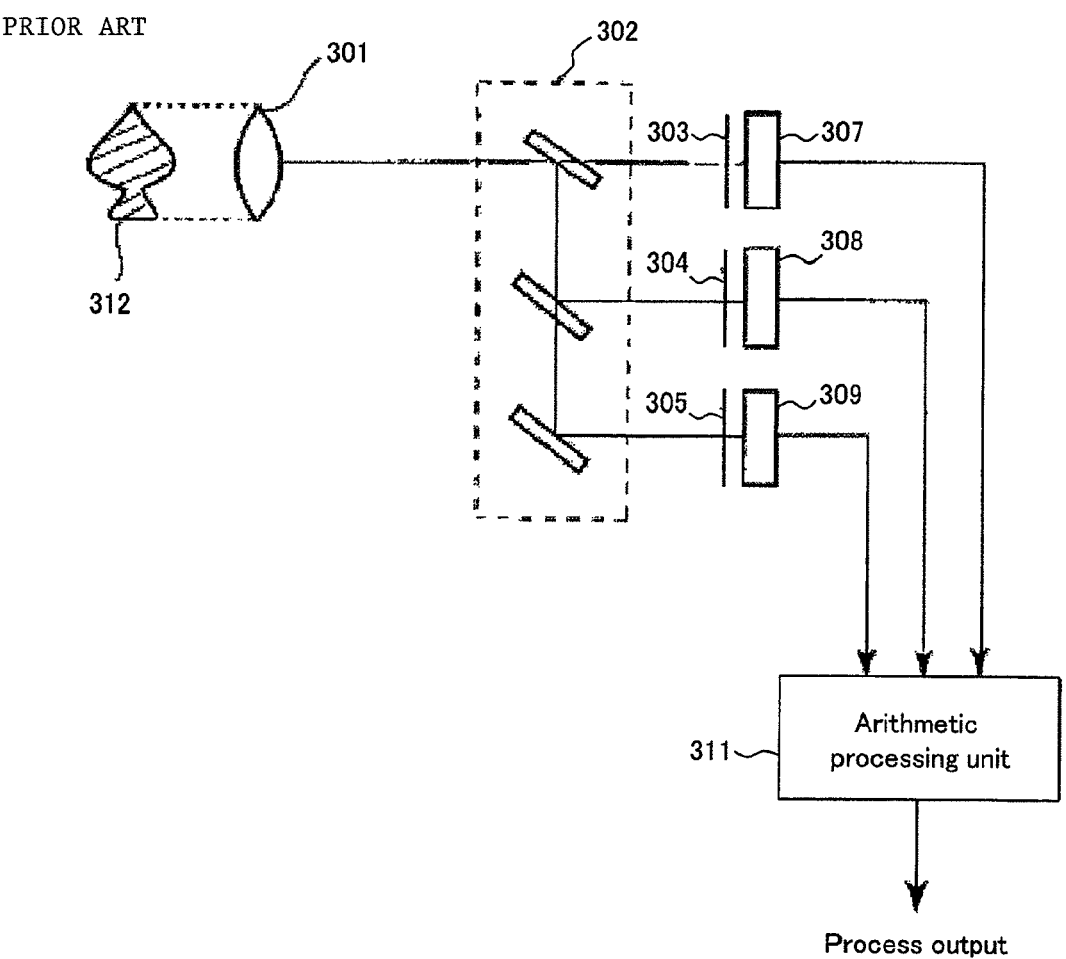
FIG. 15 shows a typical three-chip camera using color matching functions XYZ.
Figure 16:
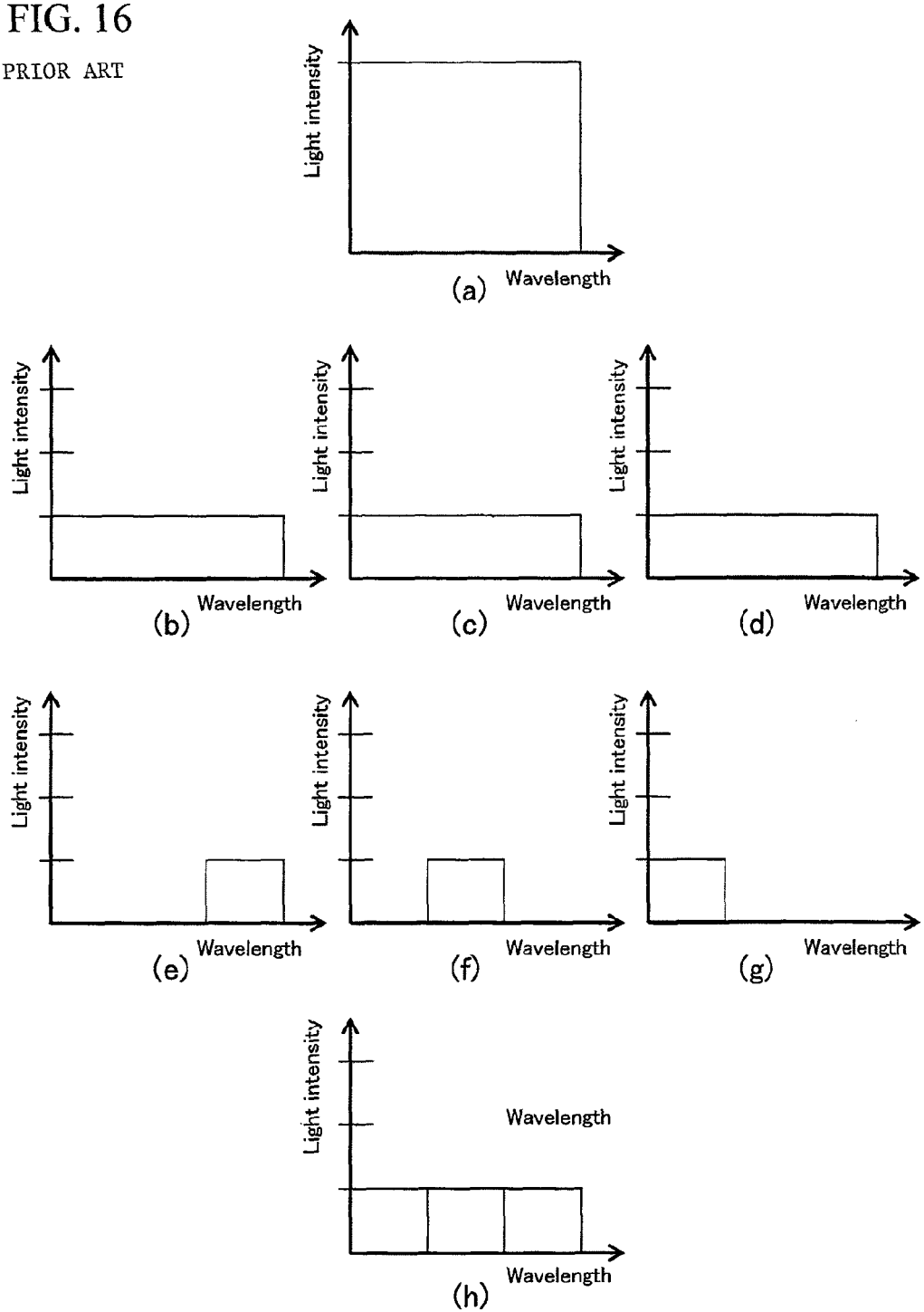
FIG. 16 are conceptual diagrams showing the light use efficiency of a typical three-chip system using color matching functions XYZ.

FIG. 9 are conceptual diagrams of the light use efficiency for the above case. As shown in FIG. 9A, the horizontal axis represents the wavelength of incident light and the vertical axis represents the light intensity thereof. A state in which the light intensity is constant at various wavelengths is shown. The light is transmitted and reflected by the aforementioned beam splitter, and thus the light intensity becomes 1/4 as shown in FIGS. 9A, 9B, 9C, and 9D. Light obtained with the transparent filter (W filter) that transmits light in almost the entire, visible wavelength region or the optical sensor without a filter (the optical sensor 40 of FIG. 8) has, upon entering the image sensor, similar components to those of FIG. 4B, as shown in FIG. 8F. When loss is ignored, the light intensity of the obtained light can be considered as the same as that of the light that has just been split by the beam splitter.

The W-X filter transmits light with W-X components. Thus, the light has, upon entering the corresponding image sensor, the light intensity as shown FIG. 9G. When loss by the filter and the like is ignored the light intensity of the obtained light can be considered as the same as that of the incident light that has just been split by the beam splitter. Similarly the W-Y filter transmits light with W-Y components. Thus, the light has, upon entering the corresponding image sensor, the light intensity as shown in FIG. 9H. When loss by the filter and the like is ignored, the light intensity of the obtained light can be considered as the same as that of the incident light that has just been split by the beam splitter.

The W-Z pixel transmits light with W-Z components. Thus, the light has, upon entering the corresponding image sensor, the light intensity as shown in FIG. 9I. When loss by the filter and the like is ignored, the light intensity of the obtained light can be considered as the same as that of the incident light that has just been split by the beam splitter.

Light that can be used to reproduce the subject to be imaged by electronically combining the light that has entered each image sensor is deceased to about 3/4 as shown in FIG. 9J, compared to the light intensity of the incident light shown in FIG. 9A. Accordingly, the light use efficiency can be improved two times or more the light use efficiency (1/3) of a single-chip system or a three-chip system that uses conventional XYZ filters.

As described above, according to the present embodiment, accurate color values can be imaged with high light use efficiency by using transparent pixel filters and filters that exhibit complementary colors for the color matching functions XYZ.

INDUSTRIAL APPLICABILITY

The present invention can be applied to imaging devices and imaging apparatuses.

The invention claimed is:
1. A color imaging device configured to capture a color image, comprising at least the following four filters:
   a transparent filter;
   a filter that exhibits a transmission characteristic complementary to a transmission characteristic of a color matching function X;
   a filter that exhibits a transmission characteristic complementary to a transmission characteristic of a color matching function Y; and
   a filter that exhibits a transmission characteristic complementary to a transmission characteristic of a color matching function Z.

2. An imaging apparatus comprising the color imaging device according to claim 1.

3. A color imaging device configured to capture a color image, comprising at least the following four filters:
   a transparent filter;
   a filter that exhibits a transmission characteristic complementary to a transmission characteristic equivalent to a color matching function X;
   a filter that exhibits a transmission characteristic complementary to a transmission characteristic equivalent to a color matching function Y; and
   a filter that exhibits a transmission characteristic complementary to a transmission characteristic equivalent to a color matching function Z.

4. A color imaging device configured to capture a color image, comprising at least the following four pixels each having a filter:
   a pixel with a transparent filter;
   a pixel with a filter that exhibits a transmission characteristic complementary to a transmission characteristic of a color matching function X;
   a pixel with a filter that exhibits a transmission characteristic complementary to a transmission characteristic of a color matching function Y; and
   a pixel with a filter that exhibits a transmission characteristic complementary to a transmission characteristic of a color matching function Z.

5. The color imaging device according to claim 4, wherein the transparent pixel and the pixel that exhibits the transmission characteristic complementary to the transmission characteristic of the color matching function Y are arranged diagonally.

6. A color imaging device configured to capture a color image, comprising at least the following four pixels each having a filter:
   a pixel with a transparent filter;
   a pixel with a filter that exhibits a transmission characteristic complementary to a transmission characteristic equivalent to a color matching function X;
   a pixel with a filter that exhibits a transmission characteristic complementary to a transmission characteristic equivalent to a color matching function Y; and
   a pixel with a filter that exhibits a transmission characteristic complementary to a transmission characteristic equivalent to a color matching function Z.

7. The color imaging device according to claim 6, wherein the transparent pixel and the pixel that exhibits a transmission characteristic complementary to the transmission characteristic equivalent to the color matching function Y are arranged diagonally.

8. Filters for use in a color imaging device, comprising at least the following four filters for pixels:
   a filter for a transparent pixel;
   a filter for a pixel, the filter exhibiting a transmission characteristic complementary to a transmission characteristic of a color matching function X;
   a filter for a pixel, the filter exhibiting a transmission characteristic complementary to a transmission characteristic of a color matching function Y; and
   a filter for a pixel, the filter exhibiting a transmission characteristic complementary to a transmission characteristic of a color matching function Z.

9. The filters according to claim 8, wherein the filter for the transparent pixel and the filter for the pixel, which exhibits the transmission characteristic complementary to the transmission characteristic of the color matching function Y, are arranged diagonally.

10. Filters for use in a color imaging device, comprising at least the following four filters for pixels:

a filter for a transparent pixel;

a filter for a pixel, the filter exhibiting a transmission characteristic complementary to a transmission characteristic equivalent to a color matching function X;

a filter for a pixel, the filter exhibiting a transmission characteristic complementary to a transmission characteristic equivalent to a color matching function Y; and a filter for a pixel, the filter exhibiting a transmission characteristic complementary to a transmission characteristic equivalent to a color matching function Z.

11. The filters according to claim 9, wherein the filter for the transparent pixel and the filter for the pixel, which exhibits the transmission characteristic complementary to the transmission characteristic equivalent to the color matching function Y, are arranged diagonally.

* * * * *